(12) United States Patent
Guy

(10) Patent No.: US 6,542,309 B2
(45) Date of Patent: Apr. 1, 2003

(54) FLEXIBLE LENS

(75) Inventor: James K. Guy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 62 days.

(21) Appl. No.: 09/897,514

(22) Filed: Jun. 29, 2001

(65) Prior Publication Data

US 2003/0002169 A1 Jan. 2, 2003

(51) Int. Cl.⁷ .............................. G02B 1/06; G02B 3/12
(52) U.S. Cl. ...................................... 359/666; 359/739
(58) Field of Search ........................... 359/665–667, 359/739

(56) References Cited

U.S. PATENT DOCUMENTS

| | | | |
|---|---|---|---|
| 2,300,251 A | 10/1942 | Flint | 359/665 |
| 2,836,101 A | * 5/1958 | deSwart | 359/666 |
| 3,161,718 A | 12/1964 | DeLuca | 359/666 |
| 3,802,533 A | * 4/1974 | Brenden | 181/176 |
| 4,444,471 A | 4/1984 | Ford, Jr. et al. | 359/676 |
| 4,466,706 A | 8/1984 | Lamothe, II | 359/666 |
| 4,732,458 A | 3/1988 | Zambelli | 359/666 |
| 5,684,637 A | 11/1997 | Floyd | 359/666 |
| 5,774,273 A | * 6/1998 | Bornhorst | 359/665 |
| 6,002,524 A | 12/1999 | Schubert | 359/642 |

* cited by examiner

Primary Examiner—Scott J. Sugarman
Assistant Examiner—Darryl J. Collins
(74) Attorney, Agent, or Firm—Harness Dickey & Pierce P.L.C.

(57) ABSTRACT

A flexible lens is provided that comprises at least two chambers encased by a flexible membrane and separated by a partition, wherein pressure within the chambers is regulated such that when one chamber receives positive pressure, the other chamber receives negative pressure. Accordingly, a first lens portion and a second lens portion of the flexible membrane flex in the same relative direction when the pressure is regulated. In addition, a variable optical input such as an iris diaphragm is provided that operates in concert with the flexible membrane. As a result, the flexible lens generates a constant spot size output having a substantially flat intensity distribution and a substantially uniform angular distribution. Similarly, the flexible lens generates a variable spot size output having a substantially flat intensity distribution and a substantially uniform angular distribution when the optical input is constant.

24 Claims, 7 Drawing Sheets

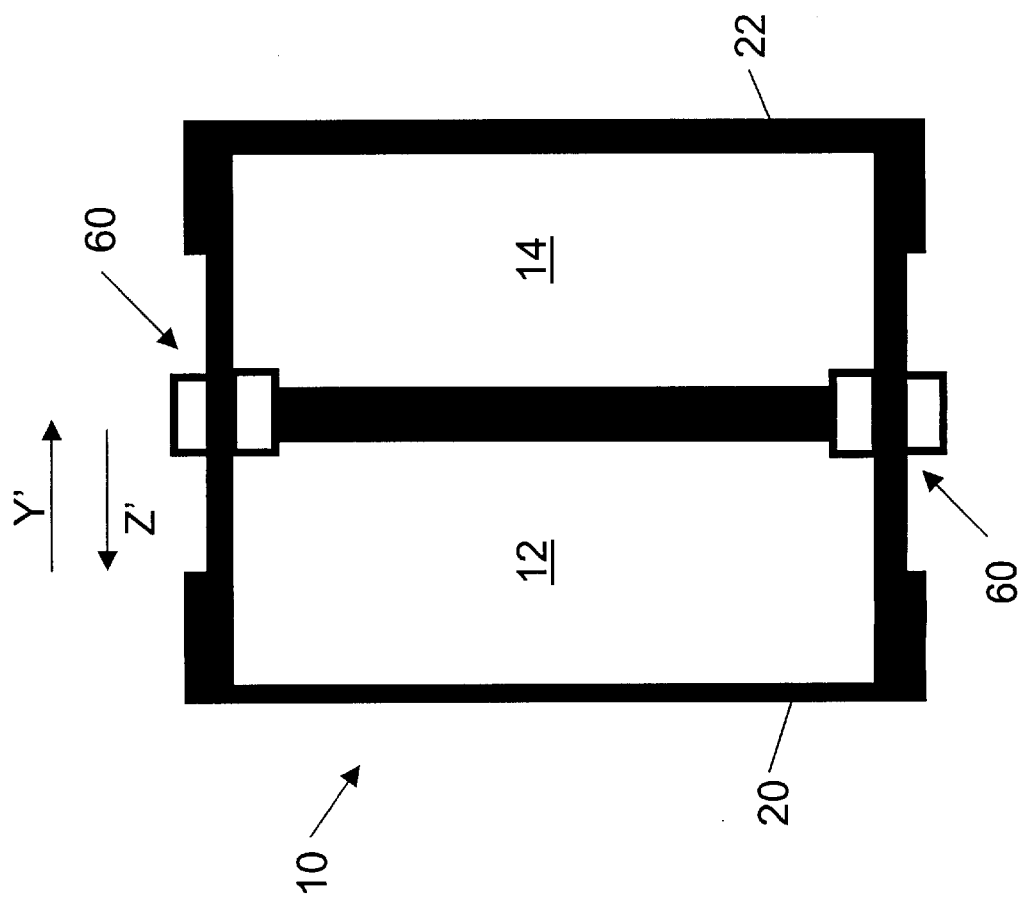

FLEXIBLE LENS

FIELD OF THE INVENTION

The present invention relates generally to optical lenses and more particularly to flexible lenses for controlling optical properties by varying the pressure of a fluid within a chamber of the flexible lens.

BACKGROUND OF THE INVENTION

Flexible optical lenses of the known art have largely been employed to provide a variable focal length for a given optical input. Generally, known art flexible lenses comprise a single chamber encapsulated by a flexible transparent membrane and filled with a gas, liquid, or other fluid. By changing the pressure of the fluid in the chamber, the shape of the flexible membrane also changes, thereby changing the focal length of the lens. With the single chamber, however, the flexible membrane is limited to providing a concave lens on both ends or a convex lens on both ends of the chamber.

Other known flexible lenses provide two independent chambers rather than a single chamber, such that a flexible membrane on each side of the lens flexes independent of the other flexible membrane. Therefore, one side of the lens may be concave and while the other is convex, and vice versa, along with various combinations thereof. For example, U.S. Pat. No. 3,161,718 to De Luca discloses a variable lens that has two fluid tight lens compartments enclosed by a flexible diaphragm on each end and separated by a clear separator disc. The variable lens further comprises two pressure actuators that independently control the amount of pressure in each compartment, and thus the amount of flex of each diaphragm. As a result, a variety of flexible lens combinations may be produced, as set forth in FIGS. 7A through 7H, to control the focal length of an optical input. Additionally, De Luca and other known flexible lenses are limited to a constant optical input wherein optical properties are exclusively controlled by the flexible membrane and/or the substance within the compartments.

With many optical applications, and more specifically with regard to fiber optic applications, a terminated bundle of fibers receives light from an optical input such as a collimated beam for subsequent transmission of the light in an optical system. An important aspect of transmitting light to the bundle involves providing a constant spot size output of the light to the face of the fibers such that each fiber receives approximately the same amount of light. In addition, the intensity distribution of the output must be substantially flat such that all of the fibers receive approximately the same intensity of light. Moreover, the angular distribution of the light must similarly be substantially uniform.

At times, the intensity of the optical input must be varied while still maintaining a constant spot size output, a substantially flat intensity, and a substantially uniform angular distribution in order to accommodate different fiber bundle sizes and different operating requirements of the fiber bundle. Unfortunately, flat intensity distributions and uniform angular distributions are difficult to produce with optical systems of the known art, primarily because an iris that adjusts the optical input has a limited minimum size. If the minimum size of the iris becomes smaller than the face of the fiber bundle, the fibers around the periphery of the bundle cannot receive the same amount of light.

Unfortunately, using a focused beam of light, i.e. output from a flexible lens of the known art, an approximate gaussian intensity distribution results across the face of a fiber bundle, which is not a flat intensity distribution. The intensity may be controlled using an iris, for example, or by changing the power output of a lamp. However, changing the power output of the lamp alters the intensity distribution and also the color temperature of the light. Accordingly, the color temperature may be maintained while the power output of the lamp is held constant by employing an iris with a variable aperture to control intensity. As a result, however, the spot size of the output changes and not all of the fibers in the bundle may receive an equal distribution of light or a substantially flat intensity distribution and a substantially uniform angular distribution.

Accordingly, there remains a need in the art for a flexible lens that provides a constant spot size output, a substantially flat intensity distribution, and a substantially uniform angular distribution across a target area while changing the intensity of an optical input. The flexible lens should operate without changing the color temperature of the light and should further be capable of enlarging or reducing the spot size output while maintaining a substantially flat intensity distribution and a substantially constant angular distribution.

SUMMARY OF THE INVENTION

In one preferred form, the present invention provides a flexible lens that comprises at least two chambers separated by a partition and encased in a flexible membrane. The flexible lens further comprises a regulator in communication with the chambers that controls the pressure therein. Further, an optical input is provided, which may be variable or constant depending on the desired output characteristics as further described below, which results in a constant or variable spot size output, respectfully, with a substantially flat intensity distribution and a substantially constant angular distribution across a target surface, e.g., the face of a fiber bundle.

The flexible membrane that encases the chambers further comprises a first lens portion adjacent the optical input and a second lens portion adjacent the target surface. In one form, the flexible membrane is one piece that encases both chambers. In another form, two separate membranes are used to cover each chamber, wherein the membranes are secured to a support structure or other similar device as may be contemplated by one of ordinary skill in the art.

The regulator that controls the pressure within the chambers causes the first lens portion and the second lens portion to flex in the same relative direction as one chamber receives positive pressure and the other chamber receives negative pressure. Accordingly, the pressure within one chamber is dependent on the pressure within the other chamber, wherein when one chamber receives positive pressure, the other chamber receives approximately the same amount of negative pressure, and vice versa.

In one form, a constant spot size output is generated with a substantially flat intensity distribution and a substantially uniform angular distribution using a variable optical input that operates in concert with the flexible membrane. Preferably, the optical input is varied using an iris diaphragm that defines a variable aperture. The iris diaphragm is disposed adjacent the first lens portion such that light from the optical input, e.g. a parabolic reflector, may be varied to the first lens portion. As the iris diaphragm closes to form a smaller aperture, the pressure in the chamber encased by the first lens portion is decreased and the pressure in the chamber encased by the second lens portion is increased. Accordingly, the first lens portion flexes inward and the second lens portion flexes outward to maintain a constant spot size output on the target area. Further, the intensity distribution is substantially flat, in addition to a substantially constant angular distribution.

In another form, the optical input remains constant while the pressure in the chambers is varied in order to produce a variable spot size output with a substantially flat intensity distribution and a substantially constant angular distribution. Accordingly, the pressure in the chamber encased by the first lens portion is decreased and the pressure in the chamber encased by the second lens portion is increased, wherein the first lens portion flexes inward and the second lens portion flexes outward, to increase the spot size. Similarly, the pressure in the chamber encased by the first lens portion is increased and the pressure in the chamber encased by the second lens portion is decreased, wherein the first lens portion flexes outward and the second lens portion flexes inward, to decrease the spot size.

The partition that separates the chambers is preferably a solid transparent material in order to maximize light transmission. Alternately, the partition may comprise a filter such that light may be filtered to a particular spectrum. Furthermore, the chambers may be filled with air, a liquid, or other substance as required in order to achieve the desired set of optical properties.

The regulator that controls pressure within the chamber in one form is a hydraulic cylinder that is vented to one chamber on one side of a piston and vented to the other chamber on the other side of the piston. When the piston moves within the hydraulic cylinder from one side to the other, one chamber receives negative pressure while the other chamber receives positive pressure. Alternately, the pressure may be regulated using drive mechanism such as a magnetic ring that is operable with the partition, wherein the partition slides laterally to cause negative pressure in one chamber and positive pressure in the other chamber.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a side view of a magnetic ring regulator in communication with chambers of a flexible lens in accordance with the present invention.

DETAILED DESCRIPTION OF THE PREFERRED EMBODIMENTS

The following description of the preferred embodiments is merely exemplary in nature and is in no way intended to limit the invention, its application, or uses.

Figure 1:
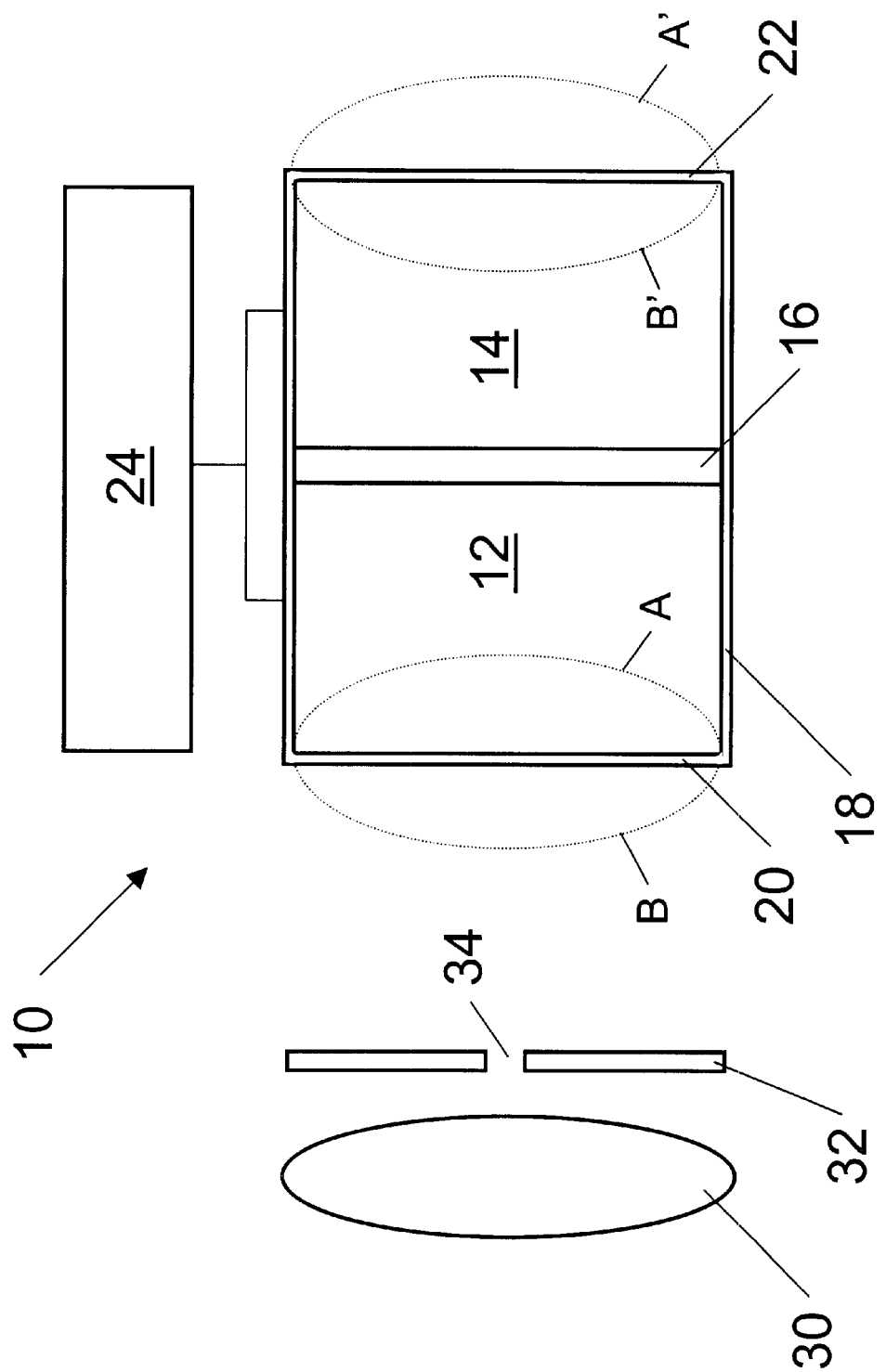
FIG. 1 is a side view of a flexible lens in accordance with the present invention.

Referring to the drawings, the flexible lens of the present invention is illustrated and generally indicated by reference numeral 10 in FIG. 1. As shown, the flexible lens 10 generally comprises a first chamber 12 and a second chamber 14 that are separated by a partition 16 and encased by a flexible membrane 18. The flexible membrane 18 further comprises a first lens portion 20 and a second lens portion 22, which flex inward or outward as indicated by the dashed lines when a regulator 24 controls the pressure within the first chamber 12 and the second chamber 14. As used herein, the terms "inward" and "outward" are defined as a direction from an approximate center of the flexible lens 10, wherein the first lens portion 20 is flexed inward as indicated by the letter A and outward as indicated by the letter B. Similarly, the second lens portion 22 is flexed outward as indicated by the letter A' and inward as indicated by the letter B'.

When the regulator 24 controls the pressure within the first chamber 12 and the second chamber 14, one chamber receives positive pressure while the other chamber receives negative pressure. Accordingly, the pressure in first chamber 12 is dependent on the pressure in second chamber 14 and vice versa. For example, when the pressure in the first chamber 12 is negative and the pressure in the second chamber 14 is positive, the first lens portion 20 flexes inward as indicated by the letter A and the second lens portion 22 flexes outward as indicated by the letter A'. Similarly, when the pressure in the first chamber 12 is positive and the pressure in the second chamber 14 is negative, the first lens portion 20 flexes outward as indicated by the letter B and the second lens portion 22 flexes inward as indicated by the letter B'.

The flexible lens 10 further comprises an optical input 30, which is varied using, for example, an iris diaphragm 32 having a variable aperture 34. In one form, the iris diaphragm 32 is operable with the flexible membrane 18 such that when the aperture 34 is closed or opened, the first lens portion 20 and the second lens portion 22 flex inward and/or outward to produce an output with a desired set of optical properties as described in greater detail below.

Referring to FIGS. 2A–2D, the operation of the flexible lens 10 with a variable optical input is illustrated in greater detail. As shown, the optical input 30 is varied using the iris diaphragm 32, which generally closes to form a smaller aperture and opens to form a larger aperture. As further shown, the optical input is preferably distributed to the iris diaphragm 32 using a parabolic reflector 36. It shall be appreciated by those skilled in the art that other forms of optical input may be employed, and the use of the parabolic reflector 36 shall not be construed as limiting the scope of the present invention.

Generally, light travels in the direction of arrow X from the optical input 30 through the iris diaphragm 32, through the first lens portion 20, through the partition 16, and finally through the second lens portion 22 onto a target area 38. As a result, a constant spot size output is generated with a substantially flat intensity distribution and a substantially constant angular distribution as described in greater detail below. The target area 38 may be, for example, a fiber bundle, a glass rod, or other device to which light is being transmitted.

Figure 2A:
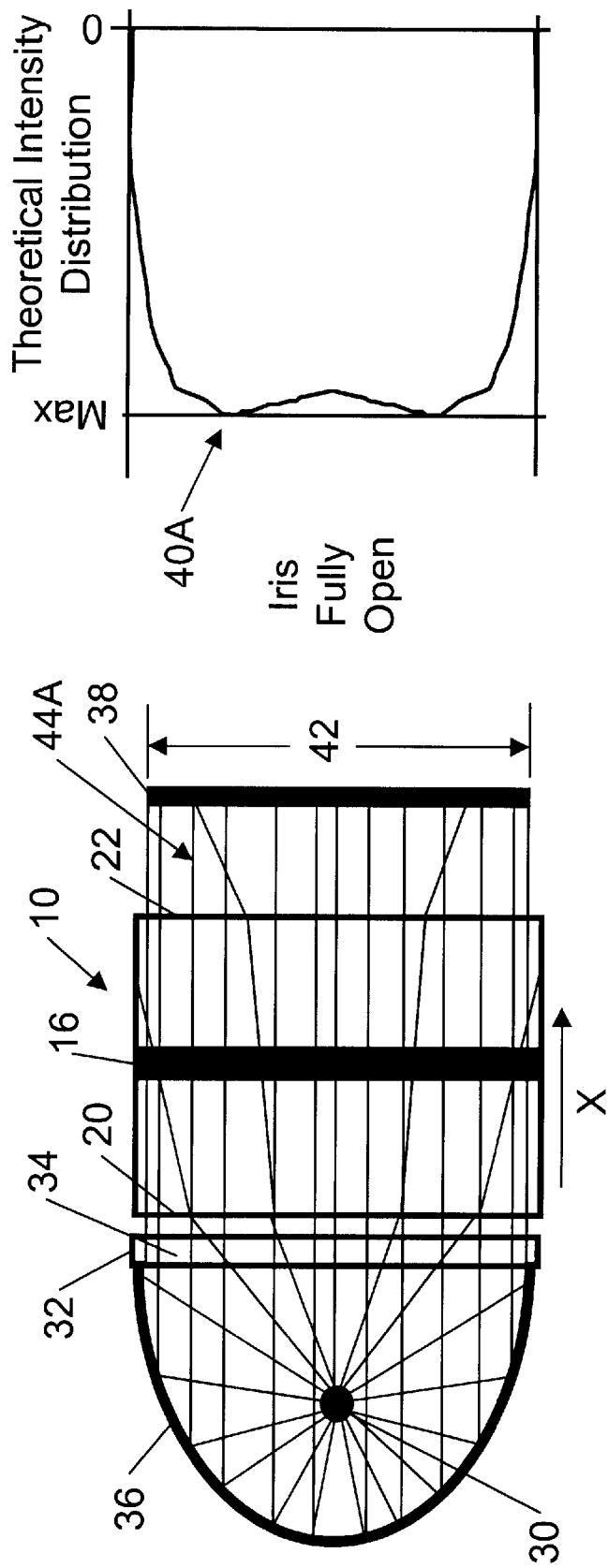
FIG. 2A is a side view of a flexible lens with an iris fully open and a corresponding intensity distribution, angular distribution, and spot size in accordance with the present invention.

As shown in FIG. 2A, the iris diaphragm 32 is fully open and the first and second lens portions 20 and 22 remain in an unflexed position. Accordingly, a theoretical intensity distribution 40A for the light that is transmitted to the target area 38 is shown along with a spot size 42. As illustrated, the spot size 42 covers the entire width of the target area 38 such that, for example, all of the fibers at the face of a fiber bundle receive approximately the same amount of light. Furthermore, the intensity distribution 40A is substantially flat and an angular distribution 44A is substantially constant across the width of the target area 38.

Figure 2B:
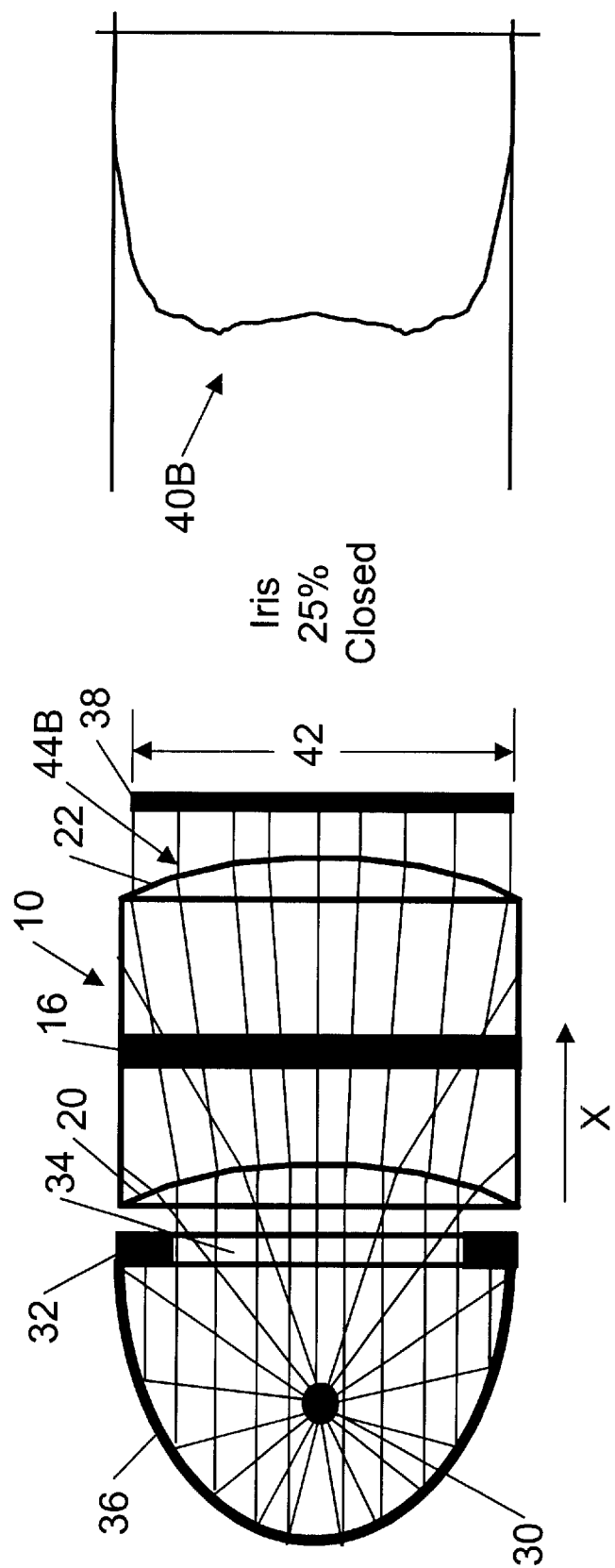
FIG. 2B is a side view of a flexible lens with an iris 25 percent closed and a corresponding intensity distribution, angular distribution, and spot size in accordance with the present invention.

Referring now to FIG. 2B, the aperture 34 of the iris diaphragm 32 is approximately 25 percent closed, and accordingly, the first lens portion 20 is flexed inward and the second lens portion 22 is flexed outward. As shown, the spot size 42 remains constant while the optical input 30 is varied. Additionally, the theoretical intensity distribution 40B remains substantially flat and the angular distribution 44B also remains substantially constant across the width of the target area 38.

Figure 2C:
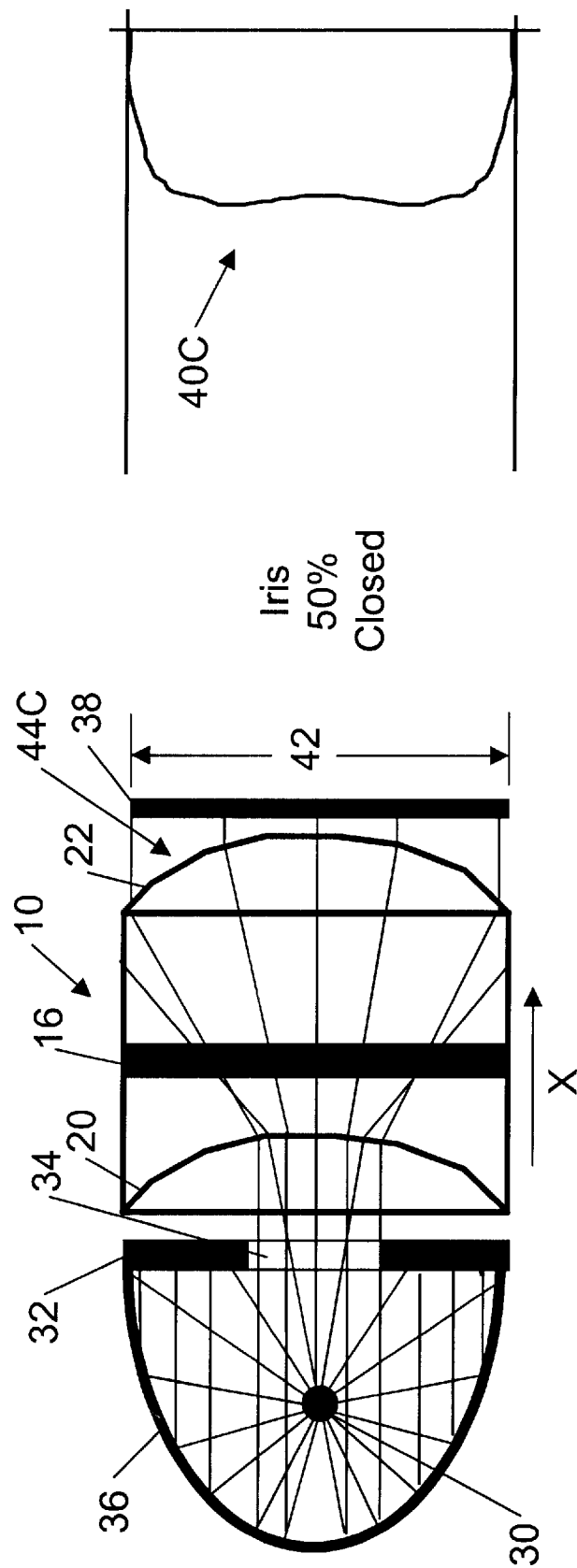
FIG. 2C is a side view of a flexible lens with an iris 50 percent closed and a corresponding intensity distribution, angular distribution, and spot size in accordance with the present invention.

The aperture 34 of the iris diaphragm 32 is further closed to approximately 50 percent as shown in FIG. 2C. Accordingly, the first lens portion 20 flexes further inward and the second lens portion 22 flexes further outward. As a result of the iris diaphragm 32 moving in concert with the flexing of the first and second lens portions 20 and 22, the spot size 42 remains constant while the theoretical intensity distribution 40C remains substantially flat and the angular distribution 44C also remains substantially constant across the width of the target area 38.

Figure 2D:
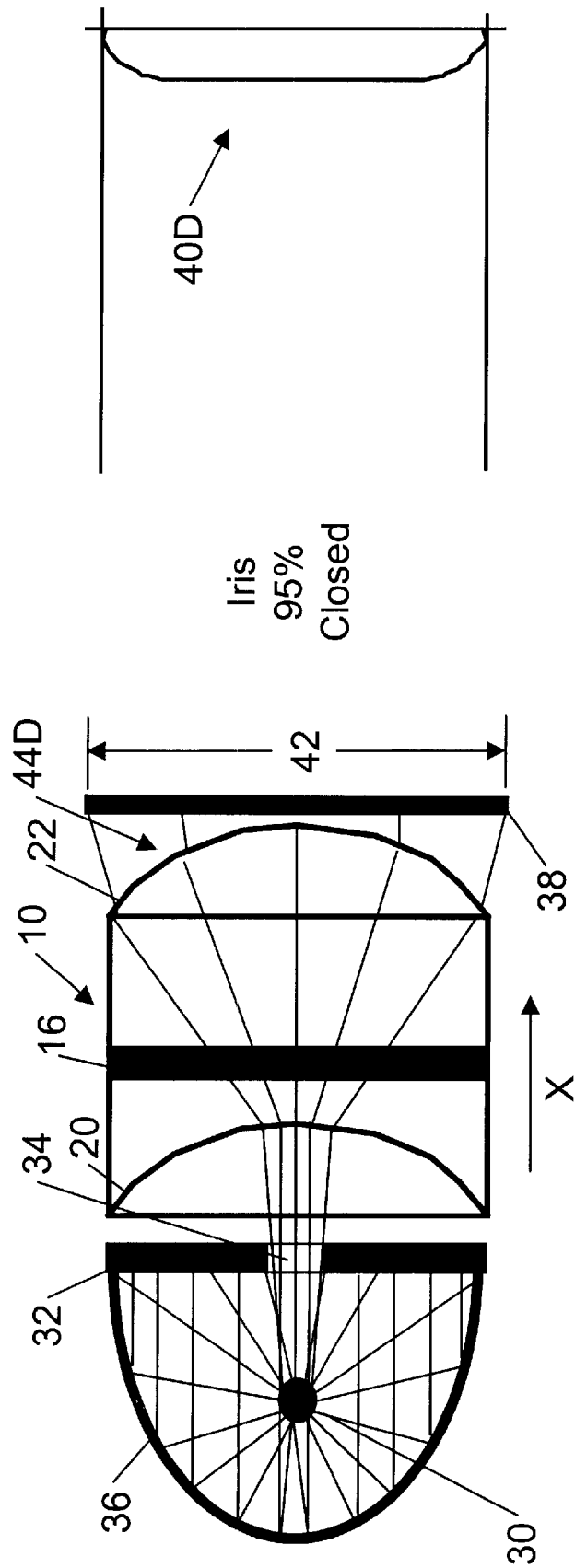
FIG. 2D is a side view of a flexible lens with an iris 95 percent closed and a corresponding intensity distribution, angular distribution, and spot size in accordance with the present invention.

As shown in FIG. 2D, the aperture 34 of the iris diaphragm 32 is further closed to approximately 95 percent, wherein the first lens portion 20 is flexed even further inward and the second lens portion 22 is flexed even further outward in concert with the movement of the iris diaphragm 32. Similarly, the spot size 42 remains constant while the theoretical intensity distribution 40D remains substantially flat and the angular distribution 44D remains substantially constant across the width of the target area 38.

In another form, (not shown), a variable spot size output is generated when the optical input 30 remains constant and the first lens portion 20 and the second lens portion 22 are flexed in the same relative direction. When the first lens portion 20 is flexed inward and the second lens portion is flexed outward, the spot size increases. Similarly, when the first lens portion 20 is flexed outward and the second lens portion is flexed inward, the spot size decreases.

Figure 3:
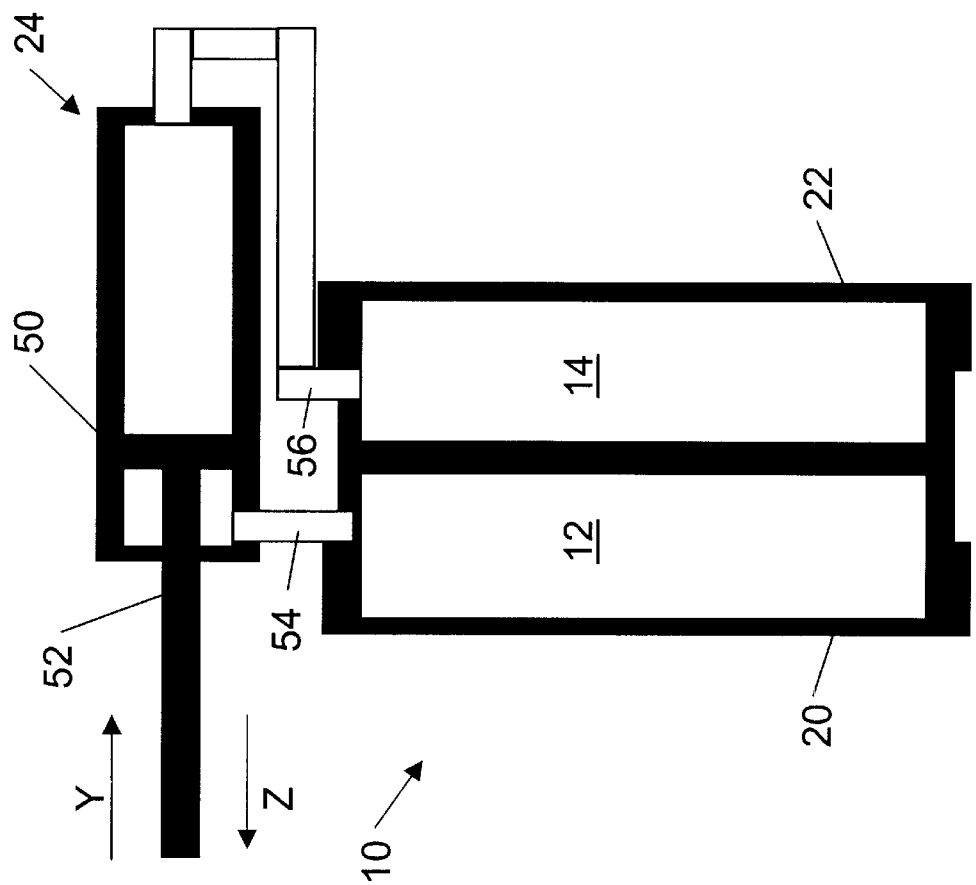
FIG. 3 is a side view of a hydraulic cylinder regulator in communication with chambers of a flexible lens in accordance with the present invention.

Referring to FIG. 3, the regulator 24 that controls the pressure within the first chamber 12 and the second chamber 14 is preferably a hydraulic cylinder 50 as shown. The hydraulic cylinder 50 houses a piston 52, which operates between a first vent 54 to the first chamber 12 and a second vent 56 to the second chamber 14. When the piston 52 moves in the direction of arrow Y, the pressure in the first chamber 12 decreases and the pressure in the second chamber 14 correspondingly increases. Accordingly, the first lens portion 20 flexes inward and the second lens portion flexes outward. (Not shown). Similarly, when the piston 52 moves in the direction of arrow Z, the pressure in the first chamber 12 increases and the pressure in the second chamber 14 correspondingly decreases, which results in the first lens portion 20 flexing outward and the second lens portion 22 flexing inward. (Not shown).

In yet another preferred form, the regulator 24 is a drive mechanism such as a magnetic ring 60 as shown in FIG. 4. The magnetic ring 60 is operable with the partition 16 such that the partition 16 slides laterally in the direction of arrows Y' and Z' to cause negative pressure in one chamber and positive pressure in the other chamber. For example, movement of the partition 16 in the direction of arrow Y' decreases the pressure in the first chamber 12 and increases the pressure in the second chamber 14. Accordingly, the first lens portion 20 flexes inward and the second lens portion flexes outward. (Not shown). Similarly, when the magnetic ring 60 causes movement of the partition 16 in the direction of arrow Z', the pressure in the first chamber 12 increases and the pressure in the second chamber 14 correspondingly decreases, which results in the first lens portion 20 flexing outward and the second lens portion 22 flexing inward. (Not shown).

It shall be appreciated by those skilled in the art that other devices and methods to control the pressure in the first chamber 12 and the second chamber 14 may also be employed in accordance with the teachings of the present invention. Furthermore, the first and second chambers 12 and 14 may be filled with air, liquid, or other substance in order to control the output according to a desired set of optical properties. Additionally, the partition 16 is preferably a solid transparent material to maximize light transmission. Alternately, the partition 16 may comprise a filter in order to filter light to a particular spectrum.

Accordingly, the flexible lens 10 of the present invention provides a constant spot size output to a target area 38, wherein, for example, all fibers within a fiber bundle receive approximately the same amount of light. Furthermore, the flexible lens 10 also provides a substantially flat intensity distribution and a substantially constant angular distribution, thereby increasing the performance of a variety of optical systems. Moreover, a variable spot size output is provided with a constant optical input through the operation of the flexible membrane 18 in accordance with the teachings of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flexible lens comprising:
   at least two chambers;
   a partition disposed between the two chambers;
   at least one flexible membrane encasing the chambers, the flexible membrane comprising a first lens portion and a second lens portion;
   a regulator in communication with the two chambers; and
   an optical input disposed adjacent the first lens portion, wherein when the regulator is activated, one chamber receives negative pressure and the other chamber receives positive pressure such that the first lens portion and the second lens portion flex in the same relative direction, thereby providing:
      a constant spot size output comprising a substantially flat intensity distribution and a substantially uniform angular distribution when the optical input is variable; and
      a variable spot size output comprising a flat intensity distribution and a substantially uniform angular distribution when the optical input is constant.

2. The flexible lens of claim 1, wherein the optical input is varied with an iris diaphragm, such that the iris diaphragm is moved from open to closed and from closed to open in concert with the flexing of the first lens portion and the second lens portion to generate the constant spot size output.

3. The flexible lens of claim 1, wherein the regulator further comprises a hydraulic actuator operatively engaged with the two chambers.

4. The flexible lens of claim 1, wherein the regulator further comprises a drive mechanism operatively engaged with the partition, such that the partition slides laterally to cause the negative pressure in one chamber and the positive pressure in the other chamber.

5. The flexible lens of claim 4, wherein the drive mechanism further comprises a magnetic ring.

6. The flexible lens of claim 1, wherein the partition comprises a solid transparent material.

7. The flexible lens of claim 1, wherein the partition further comprises a filter, such that the optical input is filtered to a predetermined spectrum.

8. The flexible lens of claim 1, wherein the optical input further comprises a parabolic reflector.

9. The flexible lens of claim 1 further comprising a support structure, wherein the flexible membrane, the partition, and the regulator are secured to the support structure.

10. A method of generating a constant spot size optical output having a substantially flat intensity distribution and a substantially uniform angular distribution using a variable optical input, the method comprising the steps of:

(a) providing a flexible lens comprising at least two chambers divided by a partition and encased by a flexible membrane comprising a first lens portion and a second lens portion, and a regulator that controls pressure within the two chambers such that one chamber receives positive pressure and the other chamber receives negative pressure;

(b) regulating the pressure in the chambers such that the first lens portion and the second lens portion flex in the same relative direction; and (c) varying the size of the optical input in concert with the flexing of the first lens portion and the second lens portion.

11. The method of claim 10, wherein the size of the optical input is varied from open to closed and the first lens portion flexes inward and the second lens portion flexes outward.

12. The method of claim 10, wherein the size of the optical input is varied from closed to open and the first lens portion flexes outward and the second lens portion flexes inward.

13. A method of generating a variable spot size optical output having a substantially flat intensity distribution and a substantially uniform angular distribution using a constant optical input, the method comprising the steps of:

(a) providing a flexible lens comprising at least two chambers divided by a partition and encased by a flexible membrane comprising a first lens portion and a second lens portion, and a regulator that controls pressure within the two chambers such that one chamber receives positive pressure and the other chamber receives negative pressure; and (b) regulating the pressure in the chambers such that the first lens portion and the second lens portion flex in the same relative direction.

14. The method of claim 13, wherein when the pressure in the chambers is regulated, the first lens portion flexes inward and the second lens portion flexes outward, such that the spot size of the optical output increases.

15. The method of claim 13, wherein when the pressure in the chambers is regulated, first lens portion flexes outward and the second lens portion flexes inward, such that the spot size of the optical output decreases.

16. A flexible lens comprising:

a first chamber;

a first lens portion encasing the first chamber;

a second chamber;

a second lens portion encasing the second chamber;

a partition disposed between the first chamber and the second chamber; and a regulator in communication with the first chamber and the second chamber, wherein when the regulator is activated, one chamber receives negative pressure and the other chamber receives positive pressure such that the first lens portion and the second lens portion flex in the same relative direction, thereby providing:

a constant spot size output comprising a substantially flat intensity distribution and substantially uniform angular distribution with a variable optical input; and a variable spot size output comprising a substantially flat intensity distribution and a substantially uniform angular distribution with a constant optical input.

17. The flexible lens of claim 16, wherein the optical input is varied with an iris diaphragm, such that the iris diaphragm is moved from open to closed and from closed to open in concert with the flexing of the first lens portion and the second lens portion to generate the constant spot size output.

18. The flexible lens of claim 16, wherein the regulator further comprises a hydraulic actuator operatively engaged with the two chambers.

19. The flexible lens of claim 16, wherein the regulator further comprises a drive mechanism operatively engaged with the partition, such that the partition slides laterally to cause the negative pressure in one chamber and the positive pressure in the other chamber.

20. The flexible lens of claim 19, wherein the drive mechanism further comprises a magnetic ring.

21. The flexible lens of claim 16, wherein the partition comprises a solid transparent material.

22. The flexible lens of claim 16, wherein the partition further comprises a filter, such that the optical input is filtered to a predetermined spectrum.

23. The flexible lens of claim 16, wherein the optical input further comprises a parabolic reflector.

24. The flexible lens of claim 16 further comprising a support structure, wherein the first lens portion, the second lens portion, the partition, and the regulator are secured to the support structure.

* * * * *